United States Patent [19]

Sadauskas

[11] 4,178,682
[45] Dec. 18, 1979

[54] RATCHET CABLE CUTTER

[75] Inventor: Joseph J. Sadauskas, Marlboro, Mass.

[73] Assignee: H. K. Porter, Inc., Somerville, Mass.

[21] Appl. No.: 938,401

[22] Filed: Aug. 31, 1978

[51] Int. Cl.² ............................................. B26B 13/26
[52] U.S. Cl. ..................................... 30/250; 30/192; 30/251
[58] Field of Search ............... 30/250, 251, 190, 192; 81/314, 391, 392, 393

[56] References Cited

U.S. PATENT DOCUMENTS

| | | | |
|---|---|---|---|
| 1,469,467 | 10/1923 | Wagenbach | 30/250 X |
| 1,651,216 | 11/1927 | McGill | 30/250 X |
| 2,280,159 | 4/1942 | Neal | 30/251 X |
| 3,210,844 | 10/1965 | Tontscheff | 30/250 |
| 3,243,880 | 4/1966 | Weller | 30/250 |
| 3,885,309 | 5/1975 | Lund | 30/250 |
| 4,055,891 | 11/1977 | Wick | 30/250 |

*Primary Examiner*—Jimmy C. Peters
*Attorney, Agent, or Firm*—Russell & Nields

[57] ABSTRACT

A ratchet cable cutter is provided with a double linkage between the handle and the pawl of the ratchet mechanism, and the relation between the two linkages is such that improved mechanical advantage is obtained while keeping the linkage mechanism within the limited spatial confines of the cutter tool.

2 Claims, 3 Drawing Figures

RATCHET CABLE CUTTER

BACKGROUND OF THE INVENTION

The invention relates to cutting tools, and in particular to a tool suitable for cutting cables. Cables are characterized by a plurality of strands of conductive material, such as copper or aluminum, which is relatively soft and easily cut by suitable steel cutting edges. However, cables can be relatively large in cross-section, and so a relatively large force is required to cut the cable. Accordingly, tools for cutting cables by hand are designed so as to provide large mechanical advantage between the handles and the cutting edges. However, it is also desired to keep such hand tools compact in size, and this imposes special requirements on the type of mechanical leverage that can be utilized. The motion of the cutting edges for each full movement of the handles must be relatively small, and the invention relates to cutting tools using a pawl and ratchet mechanism. Prior constructions of such tools are illustrated by the following U.S. Pat. Nos.: 1,317,758; 1,454,917; 2,280,159; 2,445,630; 2,801,468; 2,915,822; 2,939,211; 3,084,432; 3,210,844; 3,243,880; 3,885,309.

SUMMARY OF THE INVENTION

The invention provides improved mechanical advantage within a compact space by an ingenious linkage between the driving handle and the pawl which advances the cutting edge. The driving handle is pivoted at one corner of the frame of the tool, within which frame the entire linkage is confined. A drive lever is pivoted at a portion of the frame which is remote from the first pivot, and the pawl is mounted on the drive lever close to the second pivot. The drive lever is as long as the confines of the frame will permit, and the end thereof remote from the second pivot is connected to one end of a drive link. The other end of the drive link is connected to the inner end of the driving handle at a point about equidistant from the first pivot and the driven end of the drive lever. Thus, although the confines of the frame limit the angular movement of the drive lever to a relatively small angle, the driving handle can move through a relatively small angle, such as ninety degrees. Thus the actual linear displacement of the grasped end of the driving handle is much larger than it could ever be if the handle were merely an extension of the drive lever.

DETAILED DESCRIPTION OF A PREFERRED EMBODIMENT

The invention may best be understood from the following detailed description thereof, having reference to the accompanying drawings, in which.

Figure 1:
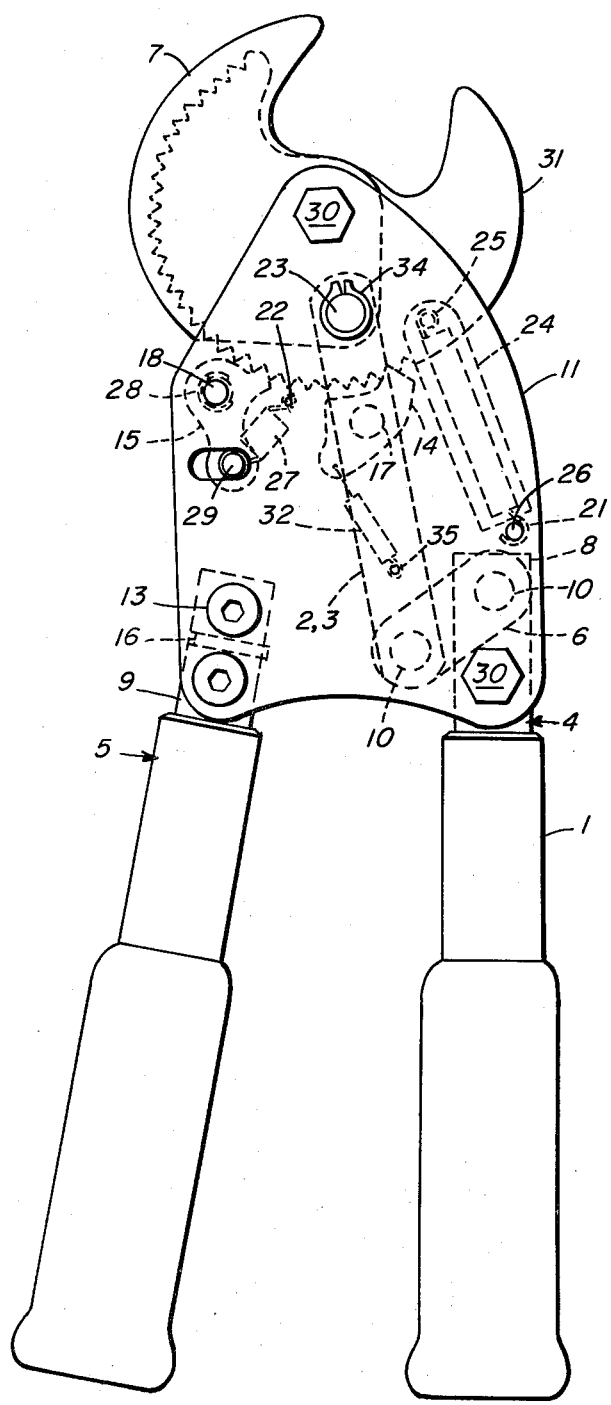
FIG. 1 is a side elevation of a ratchet cable cutter constructed in accordance with the invention, with the handles in the closed position and the cutting edges apart.
Figure 3:
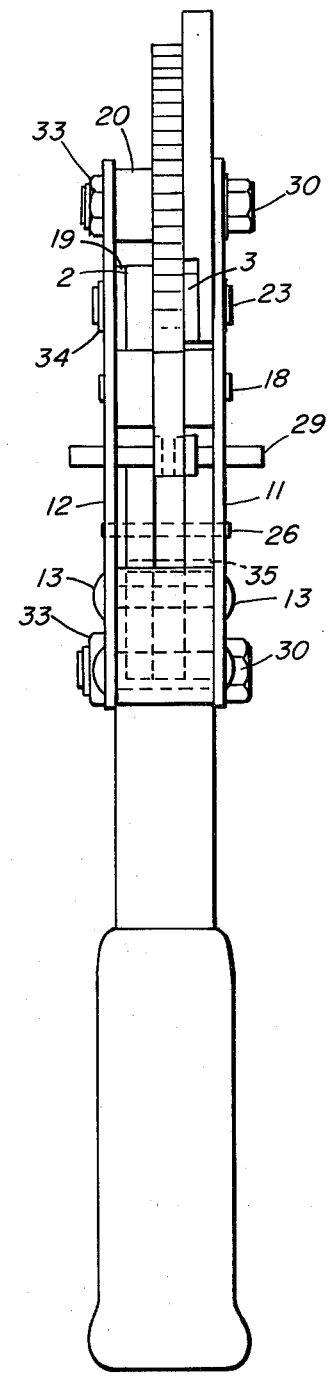
FIG. 3 is an edge view of the ratchet cable cutter of FIG. 1.

Referring to the drawings, each of two handle assemblies 4,5 comprises a fiberglass handle 1 and a handle adapter 8,9. One handle assembly 4 is the driving handle assembly and is supported upon a front side plate 11 and a rear side plate 12 by a pivot bolt 30. The other handle assembly 5 is a stationary handle assembly and is affixed to the side plates 11, 12 by four handle mounting screws 13. Cutting blades 7, 31 are supported upon the side plates 11, 12 by a second pivot bolt 30, and the two pivot bolts 30 are secured by two nuts 33. The side plates 11, 12, the bolts 30 and nuts 33, and the handle mounting screws 13 thus constitute the frame of the ratchet cable cutter within which the mechanical linkage of the invention operates.

A blade spacer 20 is mounted on the bolt 30 which supports the cutting blades 7, 31 and ensures that the cutting blades 7, 31 fit tightly against one another. One of the cutting blades 7 is a stationary blade and is fixed relative to the frame by a pivot pin 23 extending between the side plates 11, 12. The other cutting blade 31 is a ratchet blade having a ratcheted edge and having an arcuate aperture 36 therein which permits it to move with respect to the pivot pin 23. The ratchet blade 31 is flanked by a pair of drive levers 2, 3 which are supported upon the pivot pin 23 at one extremity. A pawl 14 is supported upon the drive levers 2, 3 by a pawl pivot pin 17 in such a position as to engage the ratcheted edge of the ratchet blade 31. The pawl 14 is yieldably held against the ratcheted edge of the ratchet blade 31 by a spring 32 mounted on the drive levers 2, 3 by means of a roll pin 35. The movable end of the drive levers 2, 3 are connected to a drive link 6 by one drive link pivot pin 10, and the drive link 6 is connected to the inner end of the driving handle assembly 4 by another drive link pivot pin 10. Thus, as the handle 1 of the driving handle assembly 4 is moved from the open position (FIG. 2) to the closed position (FIG. 1), the pawl 14 engages the ratchet blade 31 and advances it one notch. As the ratchet blade advances, it slips over a detent 15 by one notch, and the detent 15 then holds the ratchet blade 31 in the advanced position. The detent 15 is supported upon the side plates 11, 12 by a detent pin 18, and the detent 15 is yieldably held against the ratcheted edge of the ratchet blade 31 by a detent extension spring 27. One end of the detent extension spring 27 is affixed to a pawl stop pin 22 which mounted on the side plates 11, 12, and the other end thereof is affixed to a detent pin 29 which is mounted on the detent 15 but which is free to move with respect to the side plates 11, 12 and which extends out beyond each side plate 11, 12 so that the detent 15 can be released manually from engagement with the ratcheted edge of the ratchet blade 31.

Figure 2:
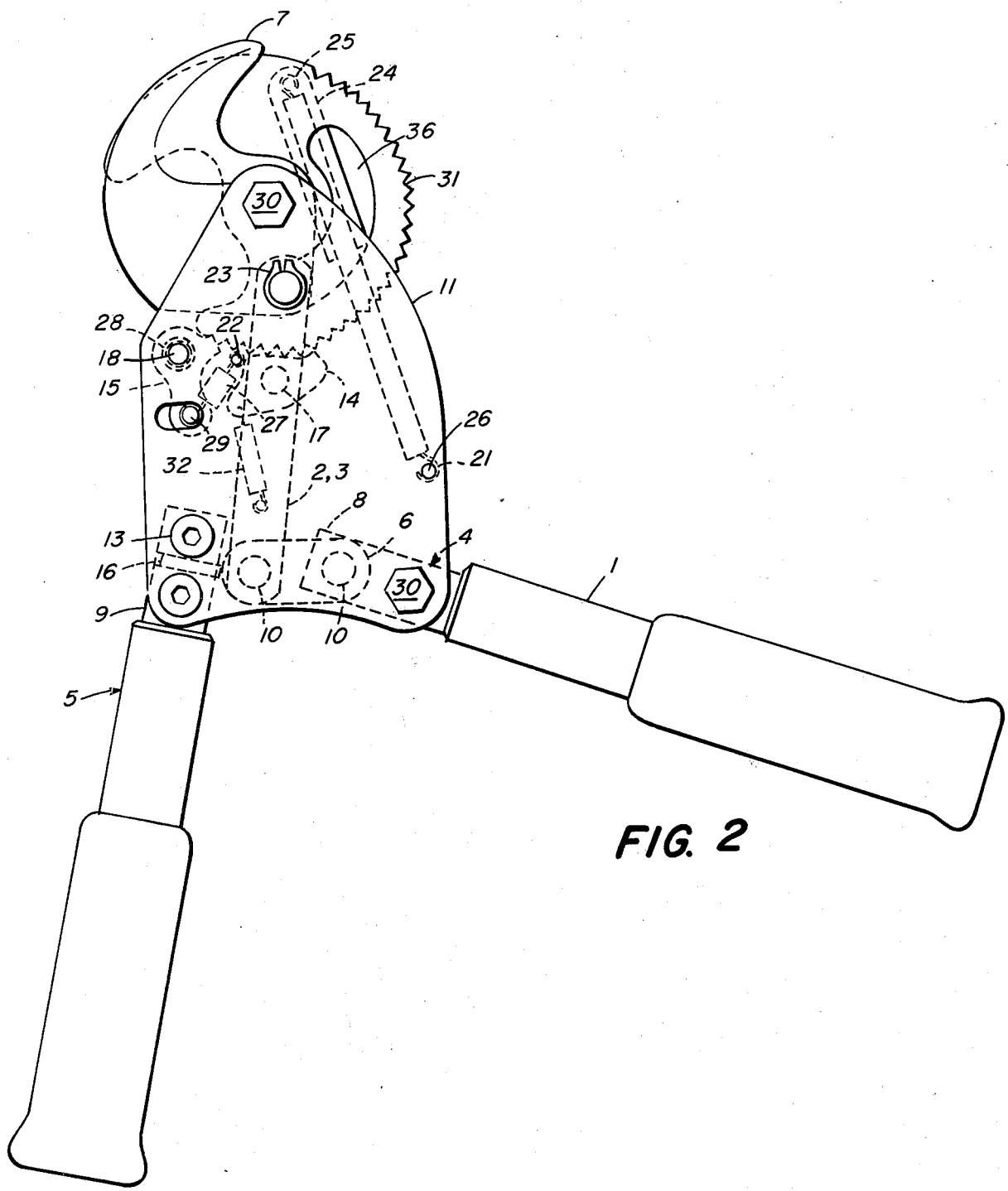
FIG. 2 is a side elevation of the ratchet cable cutter of FIG. 1, with the handles in the open position and the cutting edges together.

When the handle 1 on the driving handle assembly 4 is moved from the closed position (FIG. 1) to the open position (FIG. 2), the pawl 14 slips back over the ratcheted edge of the ratchet blade 31, while the latter is held in place by the detent 15. An extension spring 21 is connected to the ratchet blade 31 by a blade spring screw 25 and to a spring pin 26 which is affixed to the side plates 11, 12. After the cable has been cut, the detent 15 may be released manually by movement of the detent pin 29, and the extension spring 21 restores the cutting edges to the apart position (FIG. 1). Before releasing the detent 15, the driving handle assembly 4 must be moved to the open position (FIG. 2), so that the pawl 14 is lifted away from the ratcheted edge of the ratchet blade 31 by the action of the pawl stop pin 22.

When the cutting edges are together (FIG. 2) a portion of the extension spring 21 becomes exposed, and so a spring guard 24 is attached to the blade spring screw 25 to provide external shielding of the extension spring 21.

In order to prevent erratic movement of the mechanical linkage, a linkage stop screw 16 is provided in the stationary handle adapter 9. This sets a limit to the maximum movement apart of the handles 4,5.

A drive lever spacer 19 is mounted on the pivot pin 23 to secure the drive levers 2, 3 between the side plates 11, 12.

Retaining rings 28 hold the detent pin 18 in position on the side plates 11, 12; removal of these retaining rings 28 permit removal of the detent pin 18. Similarly, retaining rings 34 hold the pivot pin 23 in position on the side plates 11, 12; removal of these retaining rings 34 permits removal of the pivot pin 23.

I claim:

1. A ratchet cable cutter comprising, in combination, a stationary frame assembly having a stationary blade and a stationary handle assembly, a ratchet blade rotatably supported upon said frame, a driving handle assembly rotatably supported upon said frame, a drive lever rotatably supported upon said frame, a pawl rotatably supported upon said drive lever in cooperative relationship with said ratchet blade to drive said ratchet blade forward, a detent rotatably supported upon said frame assembly in cooperative relationship with said ratchet blade to restrain backward movement of said ratchet blade, and a drive link between said driving handle assembly and said drive lever.

2. A ratchet cable cutter comprising in combination a stationary frame assembly having a stationary handle assembly and a stationary blade, a ratchet blade rotatably mounted on said frame, a driving handle assembly rotatably mounted on said frame, whereby said driving handle can swing in a wide arc about a first axis, at least one drive lever rotatably mounted on said frame, whereby said drive lever can swing in a small arc within said frame about a second axis, a pawl rotatably mounted on said drive lever so as to engage said ratchet blade to drive said ratchet blade forward, a detent rotatably mounted upon said frame assembly so as to engage said ratchet blade to restrain backward movement of said ratchet blade, and a drive link connecting the end of said drive lever remote from said second axis to that end of said driving handle assembly near to said first axis.

* * * * *